Aug. 25, 1959   E. O. ENGELS ET AL   2,900,927
BREAD HANDLING APPARATUS
Filed March 17, 1955   4 Sheets-Sheet 1

INVENTORS
JOHN A. DERSCH
EUGENE O. ENGELS
BY
Searman & Searman
ATTORNEYS

Aug. 25, 1959

E. O. ENGELS ET AL 2,900,927

BREAD HANDLING APPARATUS

Filed March 17, 1955

INVENTORS
JOHN A. DERSCH
EUGENE O. ENGELS
BY

*Fearman & Fearman.*

ATTORNEYS

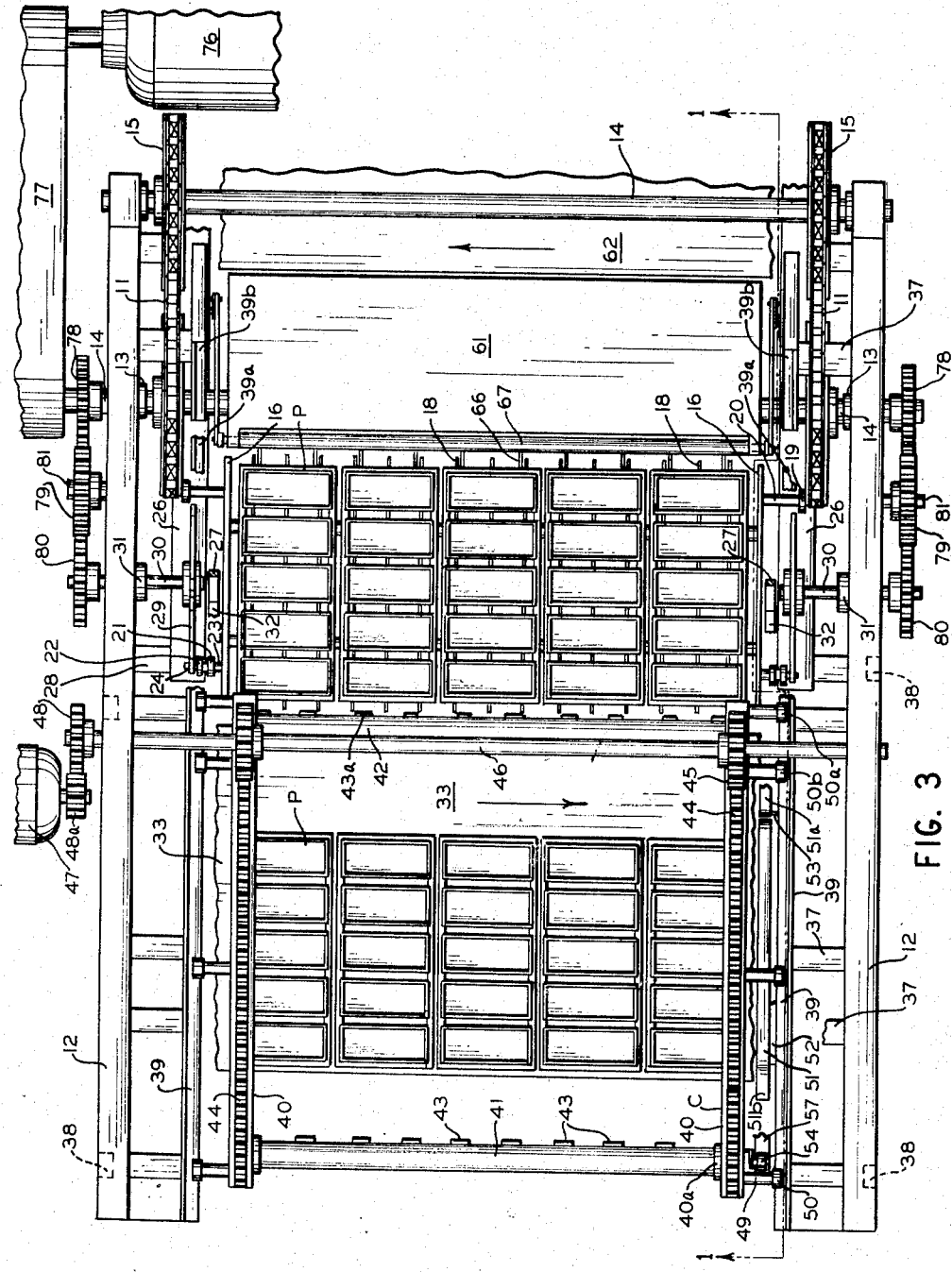

Aug. 25, 1959    E. O. ENGELS ET AL    2,900,927
BREAD HANDLING APPARATUS

Filed March 17, 1955    4 Sheets-Sheet 4

*INVENTORS*
JOHN A. DERSCH
EUGENE O. ENGELS
BY
*Fearman & Fearman.*
ATTORNEYS

United States Patent Office 2,900,927
Patented Aug. 25, 1959

2,900,927

BREAD HANDLING APPARATUS

Eugene O. Engels and John A. Dersch, Saginaw, Mich., assignors to Baker Perkins, Inc., Saginaw, Mich.

Application March 17, 1955, Serial No. 495,012

25 Claims. (Cl. 107—57)

This invention relates to bread handling apparatus and more particularly to means for simultaneously feeding baking pans to and unloading baking pans from a commercial double lap bake oven.

Various loading and unloading apparatus has been employed to both load and unload baking pans at the front of an oven. However the means employed has always been relatively complex and in common arrangements the loader and unloader have been independent one of the other and sometimes independently driven so that there has been a problem of synchronizing the operation of these individual elements. Further, the unloading element has generally tilted the conveyor trays to dump the pans thus rendering such apparatus impractical for relatively flat pans containing pies and buns which might easily slip out of the pans when the trays were tilted.

One of the prime objects of the instant invention is to design loading and unloading apparatus of simpler and more practical construction than has heretofore been devised wherein a single horizontally reciprocable element in its forward stroke is capable of very efficiently and rapidly unloading and loading the same oven tray.

A further object of the invention is to provide loading and unloading apparatus of the type described wherein the travel of bread pans into position to be loaded by the apparatus need not be delayed until the reciprocating element returns to initial position after a loading-unloading stroke.

Another object of the invention is to design loading and unloading apparatus of rugged and durable construction which requires no precision ground cams or the like to control the path of travel of the pusher elements.

A further object of the invention is to design loading and unloading apparatus as described which is very smooth in operation so that the proofed dough pieces in the pans which are being loaded on the oven trays are not subjected to shocks or impacts which would cause them to fall.

Another object of the invention is to design loading and unloading apparatus of the type described which includes but a single reciprocable loading-unloading element of reduced height operable in a horizontal path so that the oven mouth can be greatly reduced in size and more heat retained in the oven.

Still a further object of the invention is to provide loading and unloading apparatus as set forth which can be very simply and economically manufactured and installed.

In the drawings:

Fig. 1 is a sectional side elevational view taken on the line 1—1 of Fig. 3 of the front end of an oven in which the novel loading and unloading apparatus is employed with the reciprocatory loader-unloader element shown in retracted position ready to commence a combined loading and unloading operation, some of the structural framework which supports the various oven conveyor and loading-unloading elements being omitted from the view in the interest of clarity.

Fig. 3 is a top plan view of the loading-unloading apparatus and oven conveyor taken on the line 3—3 of Fig. 1.

Figure 1:
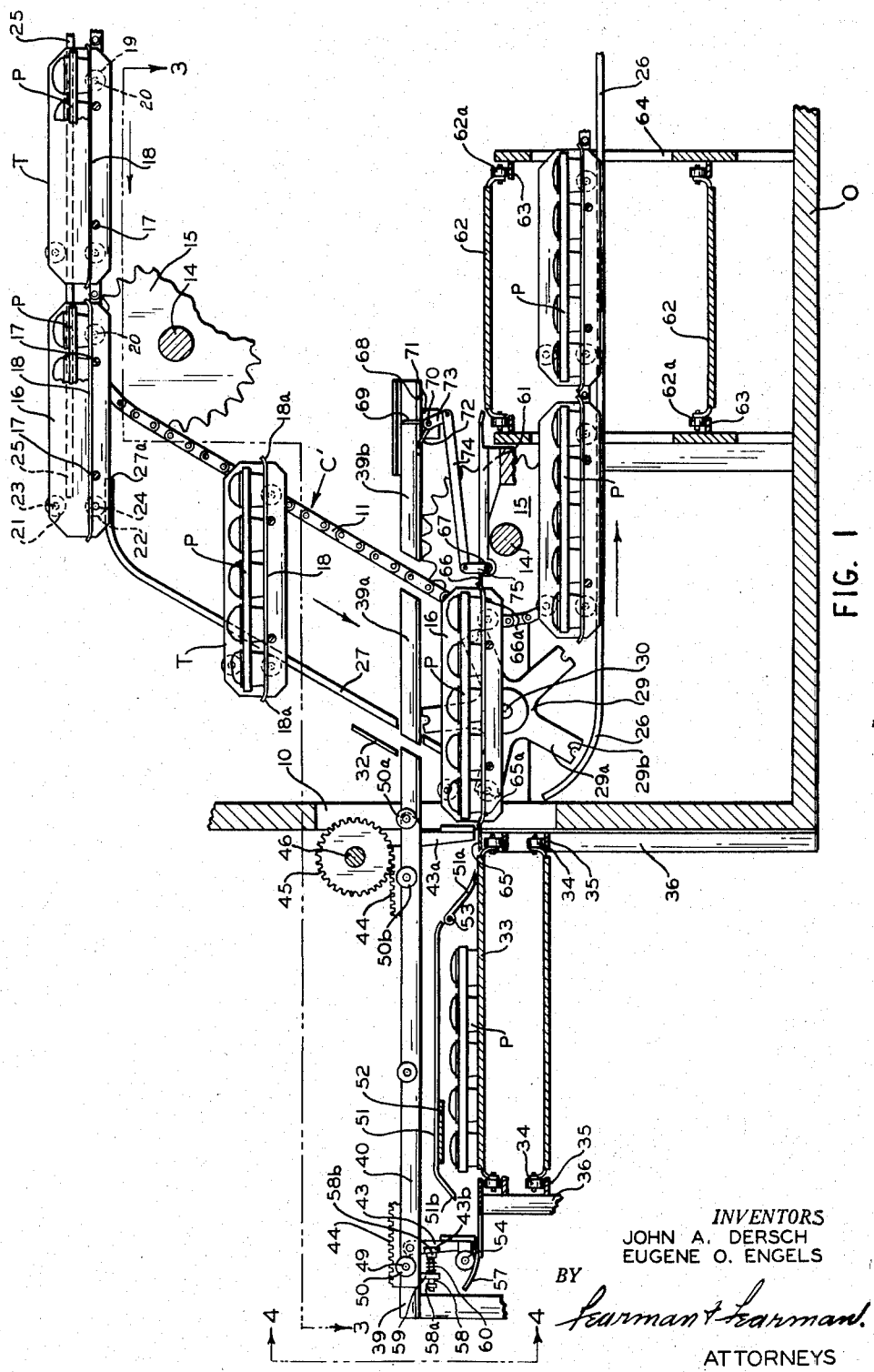

Referring now more particularly to the accompanying drawings wherein we have shown a preferred embodiment of the invention a letter O generally indicates an oven of conventional type which can be provided with a mouth 10 of greatly reduced dimensions because of the path of travel taken by the novel loading and unloading apparatus L which forms the subject matter of the instant invention. The oven is preferably of the well known double lap type in which a continuous conveyor C carrying trays T travels in a longitudinal path from the mouth of the oven to the rear end thereof, doubles back toward the front end of the oven, travels back to the rear end of the oven once again, and finally returns to the front end of the oven as shown where the pans on the trays are discharged.

Patent No. 2,052,060 granted August 25, 1936 to E. F. Sperling shows a conveyor of the type referred to except that the trays do not proceed rearwardly in an immediately longitudinal path from the mouth of the oven as do the trays in the instant oven. Accordingly, it will not be necessary to further describe the oven, and it is to be understood that the invention is directed to the novel loading-unloading apparatus shown which we contemplate may be employed with ovens and oven conveyors of different construction as well.

The conveyor as shown comprises a pair of transversely spaced endless chains 11 arranged so that the trays T thereon travel in the path indicated, and the chains are supported inside the oven by a structural framework which includes longitudinal support members 12 (see Fig. 3), bearings 13 on the members 12 supporting the shafts 14 on which the chain sprockets 15 are mounted. The trays T which are carried by the conveyor chains comprise end walls 16 connected by transverse rods 17, and spaced apart longitudinal rods 18 span the rods 17 to provide a grid type supporting surface for the pan sets P which will permit the circulation of heated air up around the individual pans in the sets. Spaced apart bearings 19 carried by the chains 11 are adapted to pivotally receive the shafts 20 which project from the end walls 16 of the trays at the rear thereof and it will be observed that a pair of vertically spaced rollers 21 and 22 are provided at the opposite ends of the walls 16 on shafts 23 and 24 which project therefrom. These rollers 21 and 22 are adapted to support the front ends of the trays T on vertically spaced longitudinal pairs of guide rails 25 and 26, and vertically inclined rails 27. The rails 25 and 26, and 27, are supported by braces 28 anchored on the members 12 and it will be observed that the guides 27 are inward of the guides 25 and 26 (Fig. 3). Similarly, the rollers 21 are inward of the rollers 22 and clear the guides 25 and 26. When the rollers 21 leave the front ends of the rails 25 the rollers 22 have moved onto the rear ends 27a of the rails 27 and are supported on the rails 27 as the tray descends at the front of the oven. A pair of star wheels or spiders 29 located outwardly of the guide rails 27 assist in transferring the trays from the rails 27 to the longitudinal rails 26, the wheels comprising radially arranged spokes 29a with notches 29b provided in the ends thereof for engaging and carrying the reduced ends of the projecting shafts 24 which extend beyond the rollers 22. Shafts 30 journaled in bearings 31 on the members 12 support the star wheels 29 which are driven at a speed correlated with the travel of the trays in a manner which will be later described. At the point where the star wheels 29 are to remove a tray from the guides 27, limited guides 32 adapted to be engaged by the rollers 21 are provided to further stabilize the trays as the transfer is effected.

Provided adjacent the mouth 10 of the oven is a transversely disposed conveyor belt 33 which carries the pan sets from a proofer or the like to points opposite the mouth 10 of the oven so that they can be loaded into the oven. Spaced rollers 34 fixed at spaced intervals to the edges of the endless belt 33 support the same on vertically spaced tracks 35 mounted on standards 36.

Figure 2:
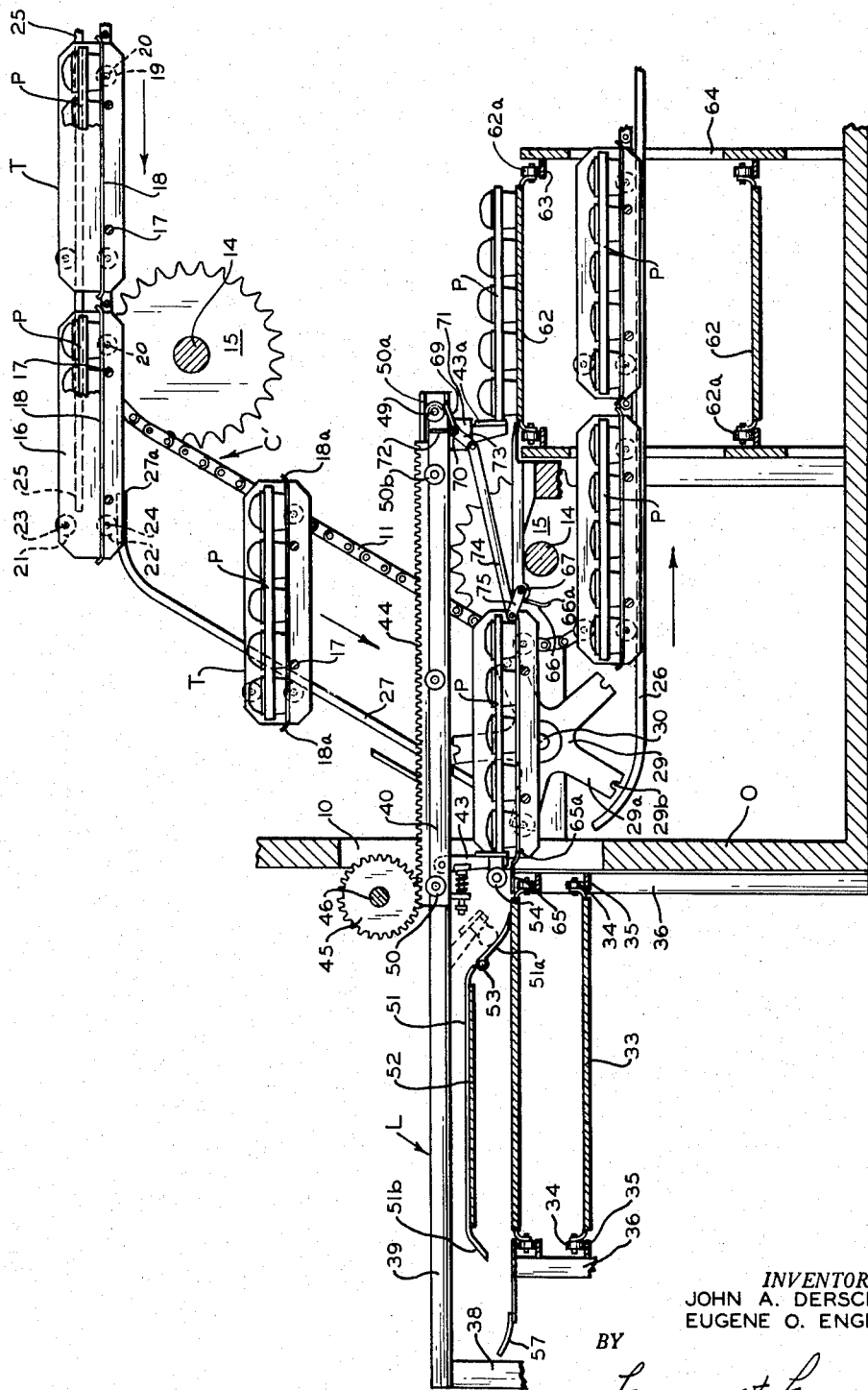
Fig. 2 is a similar view showing the loader-unloader element immediately after it has completed a loading-unloading stroke, the broken lines indicating the path taken by the hinged pusher arm assembly on the return stroke.

Provided above the belt 33 and supported by braces 37 from vertical supports 38 and beams 12 are longitudinally disposed tracks 39 which project into the oven as shown in Figs. 1 and 2. A carriage C which is movable in a longitudinal path on the tracks 39 includes longitudinal frame members 40 connected by transverse shafts 41 and 42. The shaft 42 is rigidly fixed to the members 40 so that the depending pusher arms 43a fixed thereon are immobile while the shaft 41 is pivotally received in bearings 40a on the member 40 so that the depending pusher arms 43 fixed to the shaft 41 are thus pivotally supported between the members 40. It will be seen that the arms 43 and 43a are arranged in relatively closely spaced relation on the shafts 41 and 42.

Provided on the upper faces of the members 40 are rack teeth 44 adapted to mesh with pinion gears 45 mounted on a drive shaft 46 which is driven from a reversing gear head motor 47 through gears 48 and 48a. The motor is geared down so that the travel of the carriage C into and out of the oven is relatively slow, and the dough in the pans is not subjected to impacts of a severe nature. The carriage is supported in its travel on rollers 50 which are rotatably mounted on shafts 49 which project laterally from the members 40.

Figure 4:
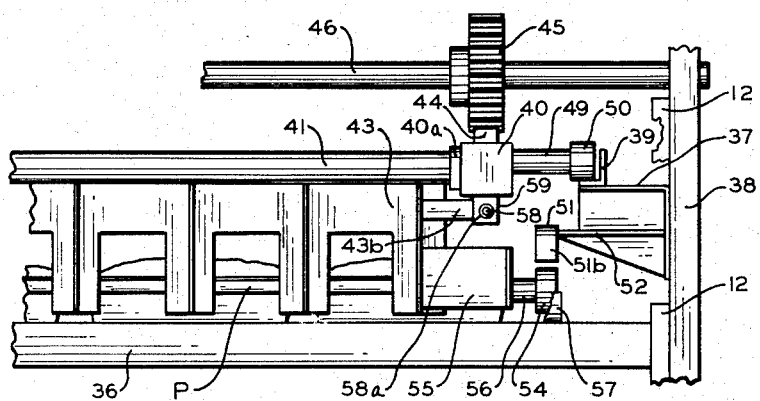
Fig. 4 is an enlarged fragmentary end elevational view taken on the line 4—4 of Fig. 1.

In order that pan sets may be moved into loading position during the return stroke of the carriage, a longitudinally disposed track 51 is provided on one side of the oven at a height sufficiently above the conveyor 33 so that it clears the pan sets P. The track 51, which is supported by braces 52 on the members 37, is provided with a curvilinear apron portion 51a having a rearwardly curved edge which rests on the belt conveyor 33. The apron 51a is pivotally connected to the track 51 at 53 so that when the carriage is moved into the oven the roller 54 (Fig. 4) on the arm 55 which extends laterally from the end pusher 43 on the shaft 41 may pivot the apron 51a upwardly and pass therebeyond. On the return journey of the carriage C the roller 54, which revolves in a bearing 56 on the arm 55, will travel up the apron 51a, pivoting the pusher arms 43 upwardly in so doing sufficiently so that the pan sets can be moved into loading position thereunder. The outer end of the track 51 slopes downwardly as at 51b forwardly of the conveyor 33 and terminates above the normal down position of the roller 54 so that the roller clears the track portion 51b when it moves toward the oven. Provided a spaced distance in front of the track 51 is a curvilinear track 57 which tends to absorb the momentum of the pusher arms 43 when they swing downwardly after leaving the portion 51b of the track 51. Additionally, a spring cushioned stop is provided to positively limit the rearward swing of the arms 43. This stop comprises a pin 58 slidable in a bracket 59 depending from the one member 40. The pin has an arm 58a thereon extending inwardly into the rearward path of the end pusher arm 43 (see Figure 4). Mounted between the enlarged front end 58b of the pin 58 and the bracket 59 on the pin is a spring 60 which cushions the downward swing of the pusher arm assembly. Further, when the arms 43 move into engagement with the pan sets containing proofed dough pieces the impact will be absorbed by the spring 60 so that the proofed dough will not be jarred sufficiently to cause it to fall. Since the pusher arms 43a on the shaft 42 are disposed forwardly of the track 51 and engage pans of baked dough, clearly, they need not be pivotally mounted or spring cushioned.

To permit the passage of the shafts 23 and 24, which project from the trays T the tracks 39 terminate short of the guides 27 and spaced apart extension tracks 39a are provided in alignment therewith. These track extensions and further track extensions 39a which are supported a spaced distance from the extension 39a to permit passage of the shafts 20 may be supported by the braces 37 in alignment therewith. The inner rollers which we shall designate 50a and 50b, must, of course, be spaced apart sufficiently so that they bridge the gaps between the track sections 39, 39a, and 39b.

When the unloading pusher arms 43a move forwardly with the carriage they push the pan sets on a given tray T to a table 61 opposite the conveyor 33 and thence to an out going conveyor belt 62 which travels transversely out of the oven. The belt 62 is similarly supported on rollers 62a riding on transversely disposed tracks 63 which are supported by standards 64.

It will be observed that the ends of the tray grid rods 18 are turned upwardly as at 18a so that the pan sets will be restrained from slipping off the trays during their circuitous passage through the oven. In order to permit loading and unloading of the pan sets, sets of transversely spaced apart fingers 65 and 66, the fingers 65 being connected and mounted on the standard 36 at a level just above the conveyor 33, are provided to bridge the gaps between the conveyor 33 and tray T, and between the tray and table 61 respectively. Both sets of fingers have downwardly turned ends 65a and 66a which are disposed between the grid members or rods 18 of the trays, however the set of fingers 66 is rigidly mounted on a pivotal shaft 67 so that the fingers 66 may be swung downwardly when the tray being unloaded has moved beyond them (see Fig. 2) so as not to interfere with the travel of the pans on the trays or the further inward travel of the pusher arms 43a. Provided in the rear end of each of the tracks 39b is a slot 68 and when the fingers 66 are in raised position as in Fig. 1 a trigger 69 is in the path of each of the rollers 50a. Each trigger 69 is rigidly fixed to a shaft 70 which is journaled in a bearing block 71 on this section 39b and it will be seen that a second trigger 72 is also rigidly fixed on the shaft 70 in vertical alignment with the slot 68. A link 73 fixed to the outer end of the shaft 70 is pivotally connected to a connecting rod 74 which is in turn pivotally connected to a link 75 which is rigid on the outer end of the finger shaft 67. When each roller 50a in approaching the end of the track section 39b pushes the trigger 69 downwardly it simultaneously raises the trigger 72 behind the roller. The shaft 70 which pivots with the trigger 69 swings the link 73 forwardly which in turn swings the link 75 forwardly and lowers the fingers 66 to the position shown in Fig. 2. On the return stroke of the carriage C the rollers 50a push the triggers 72 downwardly thus restoring the fingers 66 to raised position for the next loading-unloading stroke.

The oven conveyor C will preferably be driven by a motor 76 through a speed reduction mechanism 77 driving one of the shafts 14. The spider shafts 30 may also be driven from the motor 76 through gears 78, 79, and 80 on the shafts 14, 81, and 30 respectively.

Figure 5:
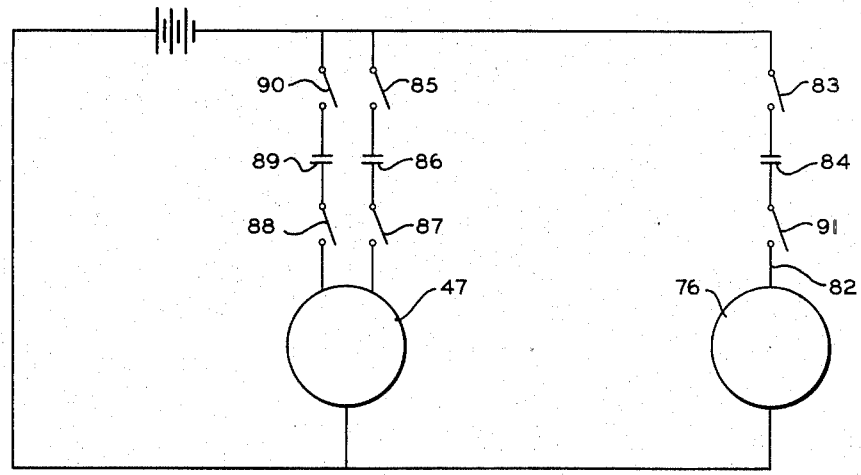
Fig. 5 shows schematically an electrical control circuit for the apparatus.

In Fig. 5 I have shown an electrical circuit which may be employed to control the operation of the motors 47 and 76. Preferably although not necessarily, the oven conveyor C slows to a stop prior to each loading-unloading operation, and thus its motor circuit 82 must be interrupted by the opening of a normally closed switch 83 which is positioned within the oven at a point where it is tripped by a descending tray T just prior to the time the tray reaches a position opposite the conveyor 33 and table 61. The opening of the switch 83 opens a holding relay 84 in the motor circuit 82. Located beside the switch 83 is a normally open switch 85 which is closed by the tray to close the holding relay 86 and start the motor 47 which revolves the shaft 46 in a clockwise direction as viewed in Fig. 1 to move the carriage C inwardly into the oven and simultaneously push the pan set on the tray to the table 61 and thence to the conveyor 62 while it is replacing the pan set which has passed through the oven with a pan set from the conveyor 33. When the carriage reaches the inner limit of its travel and has lowered the fingers 66 as described it opens a normally closed switch 87 in its path which breaks the relay 86. It also closes a normally open switch 88 in another line leading to motor 47 which closes the holding relay 89 to drive the motor 47 in the reverse direction so that the carriage C travels outwardly, raising the fingers 66 and the pusher arms 43 on the shaft 41 as it goes as has been previously described. The line in which relay 89 is shown is connected to reverse the armature connections relative to the field connections in the usual manner so that the motor is driven in the opposite direction. When the pusher carriage C reaches retracted position it depresses the normally closed limit switches 90 in its path which breaks the relay 88 and stops the motor 47, and it also simultaneously depresses the normally open switch 91 which closes the relay 84 and starts the motor 76 respectively so that the cycle may be repeated after the conveyor C has moved a successive tray into position.

With the instant loading-unloading apparatus it is apparent that no tray on the entire conveyor C is ever empty during any portion of the conveyor's travel and this fact is, of course, important since modern day bakeries stress capacity operations and increased production. Further, pushers such as those disclosed, which travel in a linear path, will reliably engage pan walls of restricted height such as the relatively flat pans which are used for pies and various buns, thus permitting an oven which employs the instant apparatus to be used for a variety of baking operations.

It is to be understood that the foregoing descriptive matter and the drawings are in all cases to be interpreted as merely illustrative of the invention rather than as limiting the scope thereof, and it is contemplated that changes within the purview of the claims may be made in the various elements which comprise the invention without departing from the spirit or principles thereof.

We claim:

1. Loading and unloading apparatus comprising, a pair of spaced apart surfaces in horizontal alignment, a conveyor movable vertically between said surfaces, said conveyor carrying spaced apart horizontally disposed trays thereon, and a loader-unloader member having a pair of spaced apart vertically projecting pusher arms disposed one on one side of one of said support surfaces and one on the other side of the same support surface when the member is in normal retracted position, means for moving said member horizontally a sufficient distance when a tray is in substantial alignment with said surfaces so that the pusher arm nearest the said tray unloads an article on said tray to the other of said surfaces while the other pusher arm moves an article from the said one of the support surfaces to the tray and means moving said member only when one of the trays is substantially in alignment with said surfaces.

2. The combination defined in claim 1 in which said pusher arm remote from said tray when the loader-unloader member is in retracted position is hingedly mounted so as to be swingable to an "up" position, and track means is provided for pivoting said latter arm to said up position during the retraction stroke of the member so that said arm passes over said one of said support surfaces and does not engage articles thereon.

3. Loading and unloading apparatus comprising a loading surface and an unloading surface in substantially horizontal alignment, a conveyor carrying horizontal trays movable vertically between said support surfaces, a horizontally reciprocating loading-unloading carriage provided a spaced distance above said support surfaces, said carriage having a pair of spaced apart depending pusher arm members disposed one on each side of the loading surface when the carriage is in retracted position, said pusher arm member remote from the conveyor being hingedly mounted to swing upwardly in a direction toward said conveyor, means limiting swing of the hinged pusher arm member in the opposite direction, a track a spaced distance above said loading surface substantially spanning the width thereof, said track having a hinged apron on the end thereof adjacent said conveyor adapted to depend toward said loading surface, means connected to the hinged pusher arm disposed directly below said track for pushing up to apron when the carriage is moved toward the conveyor so that the pusher arm member there adjacent moves an article from a tray to the unloading surface while the hinged pusher arm moves an article from the loading surface to the tray, said latter means riding up on the apron and track when the carriage returns so as not to interfere with articles moving into loading position on the loading surface.

4. The combination defined in claim 3 in which the end of said track remote from the conveyor when the carriage is in retracted position terminates outward of the edge of the loading surface remote from the conveyor permitting the hinged pusher arm member to return to depending position.

5. The combination defined in claim 3 in which said means limiting the swing of the pusher arm member in the said opposite direction is spring cushioned.

6. The combination defined in claim 3 in which tracks extending from said loading surface to said unloading surface are provided for said carriage to ride on, and said carriage includes side members with rods spanning the same, said pusher arm members comprising said rods and pusher arms depending therefrom, said rod remote from the conveyor when the carriage is in retracted position being pivotally received in said side members.

7. Loading and unloading apparatus comprising a loading surface and an unloading surface substantailly in alignment, a conveyor carrying at least one substantially horizontal tray movable vertically between said surfaces, transversely spaced apart tracks leading from the loading surface to the unloading surface a spaced distance above the same, a horizontally reciprocating carriage movable to and fro on said tracks from a retracted postion to a forward position, said carriage including side members inward of said tracks having means projecting therefrom riding on said tracks, a pair of tranversely disposed, spaced apart rods spanning said side members, and pusher arms depending from said rods straddling said loading surface and disposed outward of the path of said tray when the carriage is in retracted position, said pusher arm nearest the conveyor when the carriage is in retracted position over the loading surface unloading an article from the tray when the carriage moves from the loading surface toward the unloading surface, said pusher arm remote from the conveyor when the carriage is in retracted position replacing the article on the same tray with one from the loading surface when the carriage moves from the loading surface to the unloading surface and means moving said carriage only when one of the trays is substantially in alignment with said surfaces.

8. In combination with an oven having a mouth in an end thereof, a loading support surface adjacent the mouth of the oven outside thereof, an unloading conveyor within the oven spaced from the mouth thereof movable out of one side of the oven, said conveyor having an unloading support surface in substantially horizontal alignment with the loading surface, an endless oven conveyor including a portion traveling vertically in said oven downwardly between said loading and unloading surfaces, said oven conveyor carrying spaced apart horizontally disposed trays and moving them into alignment with said surfaces, unitary loading-unloading means, independent of said loading surface and movable across said loading surface, having spaced apart vertically projecting pushers one of which is movable through the path of descent of said tray, said pushers being spaced on opposite sides of the support surface outside said oven in position to move an article from said tray to said unloading surface and replace it on said tray with an article from said loading surface, when said means is moved into the oven into the path of said trays, and means actuated to move said loading-unloading means only when a tray is in alignment with said loading and unloading surfaces.

9. In combination with endless conveyor including spaced apart upper sprockets and lower sprockets and an end run moving vertically around said spaced apart upper sprockets and lower sprockets, said conveyor having substantially horizontally supported trays provided thereon at spaced intervals, said trays having longitudinal slots provided therein, a loading support surface on one side of the path of said trays and an unloading conveyor on the other side thereof inwardly of said lower sprockets with an unloading support surface in substantially horizontal alignment with said loading support surface, a support table between said lower sprockets in substantially horizontal alignment with said unloading surface, fingers on said table normally bridging the space between said table and a tray which has moved into substantially horizontal alignment therewith, the said fingers extending into the slots in the tray to assist in the transfer of articles on said tray to said table, reciprocating loading-unloading means in its forward stroke moving an article from said tray to said table and thence to said unloading conveyor while replacing the article with an article from said loading surface, and means engaged by said load-unloading means retracting said fingers when the article being removed has cleared said tray and restoring them to position on the return stroke of the loading-unloading means.

10. The combination defined in claim 9 in which said latter means includes elements in the reciprocatory path of travel of said loading-unloading means connected to said fingers to actuate the same.

11. The combination defined in claim 9 in which said fingers are mounted on a rocking member supported by said table, and said latter means includes trips in the path of travel of said loading-unloading means, linkage connecting said trips and rocking member to actuate the same.

12. In combination with an endless conveyor including spaced apart upper and lower rotary support members, and a front end run moving vertically around said spaced apart upper and lower rotary support members, the end run having a contiguous horizontal run, said conveyor comprising trays and spaced apart endless chains horizontally supporting said trays therebetween at spaced intervals, the trays having their rear ends pivotally supported by said chains with their front ends extending forwardly therefrom, a loading support surface in front of the said end run of the conveyor, a pair of vertically spaced, transversely extending shafts on each tray projecting outwardly therefrom, one of said shafts on each tray projecting beyond the other, guides on the ends of said shafts, a longitudinal track outward of the path of trays along said horizontal run, and a vertically inclined track at a different distance outward from the path of said trays along said front run, said guides on the shafts extending further out from said trays riding on the track further out from the path of said trays during the transfer of the front ends of the trays from the longitudinal track to the vertically inclined track, and loading-unloading means for unloading articles from said trays and replacing them with articles from said loading support surface.

13. The combination defined in claim 12 in which longitudinally disposed tracks are provided over said loading surface extending therefrom through said conveyor and therebeyond, and said loading-unloading means comprises a carriage, with depending pusher arms, reciprocable on said last named tracks, said last named tracks having gaps therein forwardly of said conveyor to permit passage therethrough of the shafts on said trays.

14. The combination defined in claim 12 in which said longitudinal conveyor guide track is spaced above the terminal end of said vertically inclined track, and the upper guide on each tray rides thereon until the lower guide on each tray engages the vertically inclined track.

15. In combination with an oven having a mouth in the front end thereof, a loading support surface in front of and adjacent the mouth of the oven, an unloading conveyor within the oven moving transversely thereof a spaced distance from the mouth thereof and movable out of one side of the oven, said conveyor having an unloading support surface in substantially horizontal alignment with the loading surface, an endless conveyor including a horizontal run and a contiguous front end portion movable at a vertically inclined angle around transversely spaced pairs of upper and lower rotary support members, said conveyor comprising a pair of spaced apart chains trained around said rotary support members horizontally supporting trays therebetween at spaced intervals, transversely spaced apart tracks loading from the loading surface to the unloading surface a spaced distance above the same, a horizontally reciprocating carriage movable to and fro on said tracks, said carriage including side members inward of said tracks having elements projecting therefrom riding on said tracks, a pair of spaced rods spanning said side members, one of said rods being located adjacent said conveyor when the carriage is over said loading surface in retracted position and the other of said rods being forwardly thereof over the opposite side of the loading surface, said latter rod being pivotally received by said side members, depending pusher arms rigid on said rods and moving an article from a tray in alignment with said loading and unloading surfaces to said unloading surface while at the same time replacing it with an article from said loading surface when the carriage moves into the oven, an arm projecting laterally from one of the endmost pusher arms on the pivotal rod, and means in the path of travel of said laterally projecting arm movable out of the path of travel of said arm when the carriage is moved toward said unloading conveyor but pivoting said laterally projecting arm and thereby said pusher arms on the pivotal rod upwardly during the return stroke of said carriage, a support table between said unloading conveyor and the path of travel of said trays, bridging members pivotally mounted on the front edge of said table for bridging the space between a tray and said table when a tray is brought substantially into horizontal alignment with said loading and unloading surfaces, and trip means in the path of travel of said carriage pivoting said bridging members downwardly when the carriage has moved inwardly and said pusher arms on the rod adjacent the conveyor have moved an article on the tray onto the table, and means driving said carriage.

16. The combination defined in claim 15 in which said trays are pivotally carried by said chains at the rear end thereof, and pairs of vertically spaced rollers are provided on the ends of said trays at the front thereof, longitudinal tracks and a vertically inclined track in different vertical planes being provided for said rollers to ride on, and one of said rollers on each tray being outward of the other.

17. The combination defined in claim 15 in which said means in the path of travel of said laterally projecting arm comprises a track located a spaced distance above said loading surface and substantially spanning the same, said track having an apron portion pivotally mounted thereon depending substantially to said loading surface.

18. In combination with a conveyor in an oven or the like, a loading surface, an unloading surface spaced therefrom, said conveyor including a run extending down between said surfaces, trays carried in spaced apart relation by said conveyor, a loading and unloading carriage spaced above said loading surface and movable into the path of travel of said trays when a tray is aligned with the loading surface, spaced apart front and rear pushers on said carriage, substantially straddling the loading surface, and on the forward stroke of the carriage moving an article from a tray onto said unloading surface and replacing it with an article from the loading surface, means for lifting said rear pusher on the retraction stroke of the carriage to permit it to clear articles moving into loading position on said loading surface, and means operating said carriage at a time when one of said trays is substantially in alignment with the adjacent portion of the loading surface.

19. In combination with a conveyor in an oven or the like, a loading surface, an unloading surface, said conveyor having a run extending down between said surfaces, trays provided with laterally spaced apart supports carried by said conveyor, a loading and unloading carriage movable into the path of travel of said trays when a tray is aligned with the loading surface, means on the carriage moving an article from a tray and reloading the conveyor with an article from the loading surface when the carriage is moved, a finger unit adapted to intermesh with the supports of said trays, mounted for movement to several positions, disposed between the run of the conveyor and one of said surfaces, and means engaged by said carriage in the latter's travel for moving said finger unit into intermeshing relation with one of said trays and retracting it from said position.

20. In combination with a conveyor in an oven or the like; a loading surface for supporting articles to be loaded; an unloading surface spaced therefrom for receiving unloaded articles; said conveyor including a run extending vertically down between said surfaces and carrying spaced trays supporting articles thereon; carriage means, including a loading element and an unloading element, in retracted position supporting both said loading element and unloading element outward of the path of said trays at the side thereof remote from said unloading surface with the loading element on one side of the loading surface and the unloading element on the other; and means moving said carriage means from said retracted position across said loading surface into the path of travel of said trays to move an article from a tray substantially aligned with said loading surface to said unloading surface with said unloading element while moving an article from said loading surface to said tray with said loading element, and returning said carriage means to said retracted position.

21. The combination defined in claim 20 in which means is provided for moving said loading element out of the path of movement it takes on the loading stroke during the return movement of the carriage means to said retracted position so that articles on the loading surface in position to be loaded are avoided on the return movement.

22. The combination defined in claim 20 in which said carriage means comprises a unitary carriage and said loading and unloading elements comprise a pair of spaced apart pusher arms mounted thereon and extending into the path of articles on said loading surface.

23. Loading and unloading apparatus comprising spaced apart support surfaces in substantially coplanar relation, a conveyor movable down between said surfaces having trays thereon which move with said conveyor into and out of substantial alignment with said surfaces, at least one support rail substantially parallel to said surfaces extending from a point outward of the path of descent of said trays into the path thereof, said rail having one section in the path of said trays spaced longitudinally from another section outward of the path thereof to pass a projecting portion of said tray therebetween, a reciprocable loading-unloading element riding on said support rail transferring an article from a tray in substantial alignment with said surfaces to one of said surfaces and replacing it on the same tray with an article from said other surface, and means moving said element only when one of the trays is substantially in alignment with said surfaces.

24. In combination with a conveyor in an oven or the like, a loading surface, an unloading surface spaced therefrom, said conveyor including a run extending down between said surfaces, trays carried in spaced apart relation by said conveyor to a point substantially below said loading surface, at least one support rail surface extending from said loading surface substantially parallel therewith into the path of said trays at a level spaced vertically from said point, loading and unloading means movable from a retracted position along said rail surface when a tray is aligned with the loading surface, said loading and unloading means including a pair of spaced pushers both outward of said path of the trays on the side thereof adjacent said loading surface when the said means is in retracted position for moving an article from said tray onto said unloading surface and replacing it on the same tray with an article from the loading surface, and means operating said loading and unloading means at a time when one of said trays is substantially in alignment with the adjacent portion of the loading surface.

25. In combination with a conveyor in an oven or the like; a loading surface for supporting the articles to be loaded; an unloading surface spaced therefrom for receiving unloaded articles; said conveyor including a run extending vertically down between said surfaces and carrying spaced trays for supporting articles thereon; means for supporting a loading element and an unloading element outward of the path of said trays at the side thereof remote from said unloading surface with the loading element on one side of the loading surface and the unloading element on the other; and means for moving said means supporting the loading element and the unloading element in a path across said loading surface into the path of travel of said trays to move an article from a tray substantially aligned with said loading surface to said unloading surface with said unloading element while moving an article from said loading surface to said tray with said loading element.

References Cited in the file of this patent

UNITED STATES PATENTS

| 1,262,016 | Close | Apr. 9, 1918 |
| 1,593,882 | Robinson | July 27, 1926 |
| 1,663,746 | Baker et al. | Mar. 27, 1928 |
| 2,274,842 | McCann | Mar. 3, 1942 |
| 2,397,726 | Cook | Apr. 2, 1946 |
| 2,436,052 | Mueller et al. | Feb. 17, 1948 |

FOREIGN PATENTS

| 341,426 | Great Britain | Jan. 14, 1931 |
| 479,005 | Italy | Mar. 12, 1953 |
| 696,123 | Great Britain | Aug. 26, 1953 |